United States Patent
Roberts et al.

[11] 3,747,560
[45] July 24, 1973

[54] BATTERY PLATE COATING APPARATUS

[75] Inventors: Maurice Roberts, Hampton-in-Arden; John Derek Harris, Solihull; Roy William Humpage, Solihull; Geoffrey George Crow, Solihull, all of England

[73] Assignee: Joseph Lucas (Industries) Limited, Birmingham, England

[22] Filed: Dec. 18, 1969

[21] Appl. No.: 886,270

Related U.S. Application Data
[60] Division of Ser. No. 814,563, April 9, 1969, abandoned, which is a continuation-in-part of Ser. No. 704,011, Feb. 8, 1968, abandoned.

[30] Foreign Application Priority Data
| Feb. 17, 1967 | Great Britain | 7,698/67 |
| July 18, 1967 | Great Britain | 32,996/67 |
| Sept. 5, 1967 | Great Britain | 40,536/67 |
| Nov. 27, 1967 | Great Britain | 53,780/67 |
| Apr. 25, 1968 | Great Britain | 19,591/68 |

[52] U.S. Cl............ 118/57, 118/120, 118/223, 118/230

[51] Int. Cl. ............ B05c 7/00, B05c 11/02
[58] Field of Search............ 118/57, 324, 100, 118/120, 230, 223; 134/1; 259/DIG. 43

[56] References Cited
UNITED STATES PATENTS
| 2,784,119 | 3/1957 | McCown et al. | 134/1 |
| 2,896,646 | 7/1959 | Watson | 134/1 X |
| 2,981,268 | 4/1961 | McAuley et al. | 134/1 X |
| 3,012,901 | 12/1961 | Reese | 118/57 UX |
| 3,467,063 | 9/1969 | Brinkley et al. | 118/324 X |

Primary Examiner—John P. McIntosh
Attorney—Holman & Stern

[57] ABSTRACT

In the manufacture of battery plates, particularly battery plates for lead-acid batteries, paste is placed on a grid in the usual way, but instead of being forced through the grid by a pasting machine as is conventional, the pasted grid is caused to pass through a gap between a probe and a support. The probe dips into the paste and is vibrated at a frequency to cause the paste to flow into the grid.

10 Claims, 7 Drawing Figures

PATENTED JUL 24 1973
3,747,560
SHEET 1 OF 3
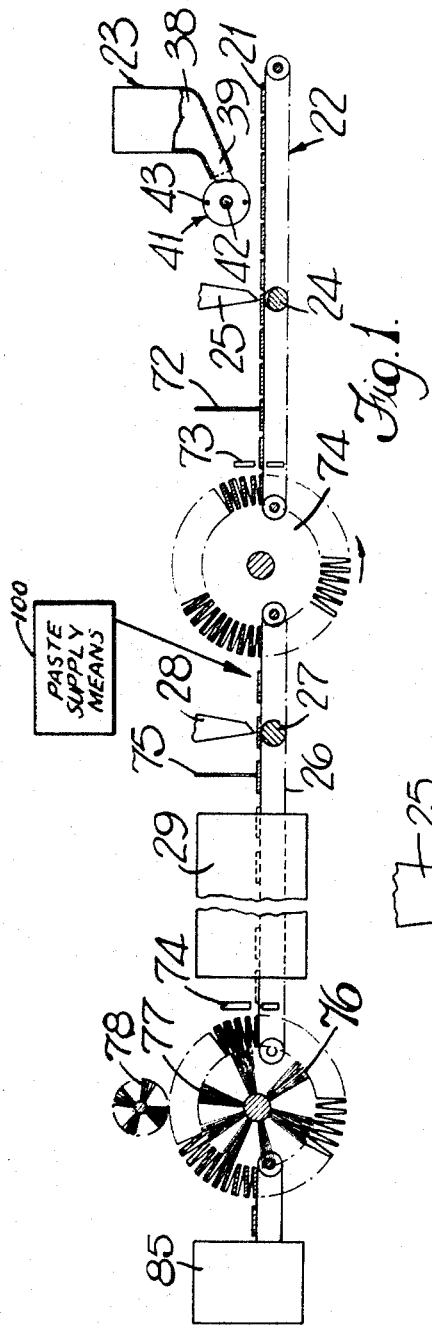
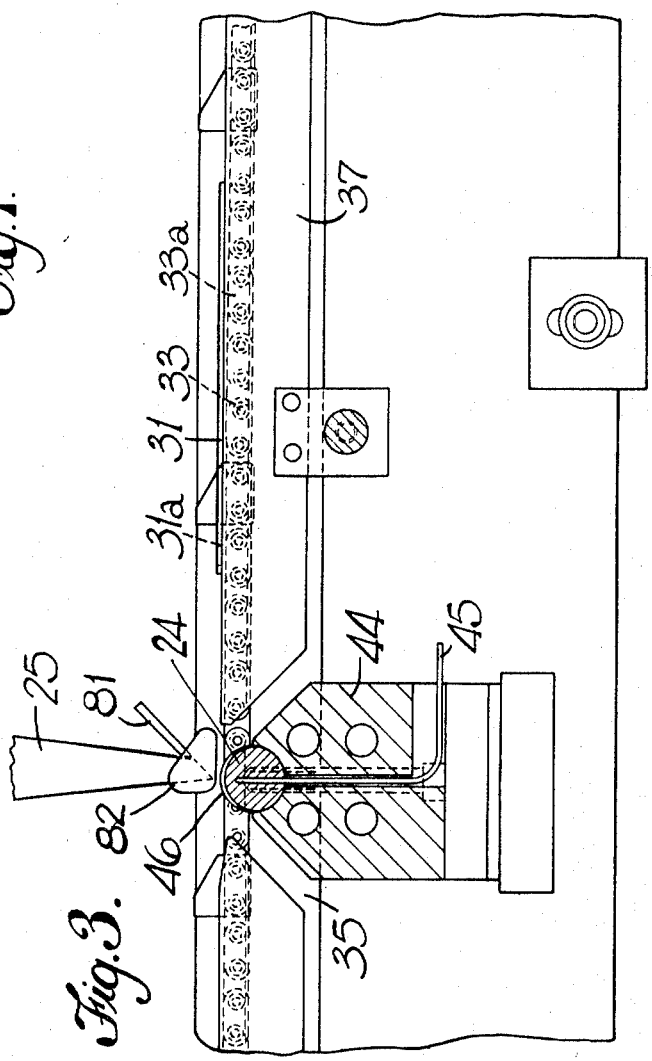
INVENTORS
Maurice Roberts, John Derek Harris, Roy William Humpage, & Geoffrey George Crow
BY
ATTORNEYS

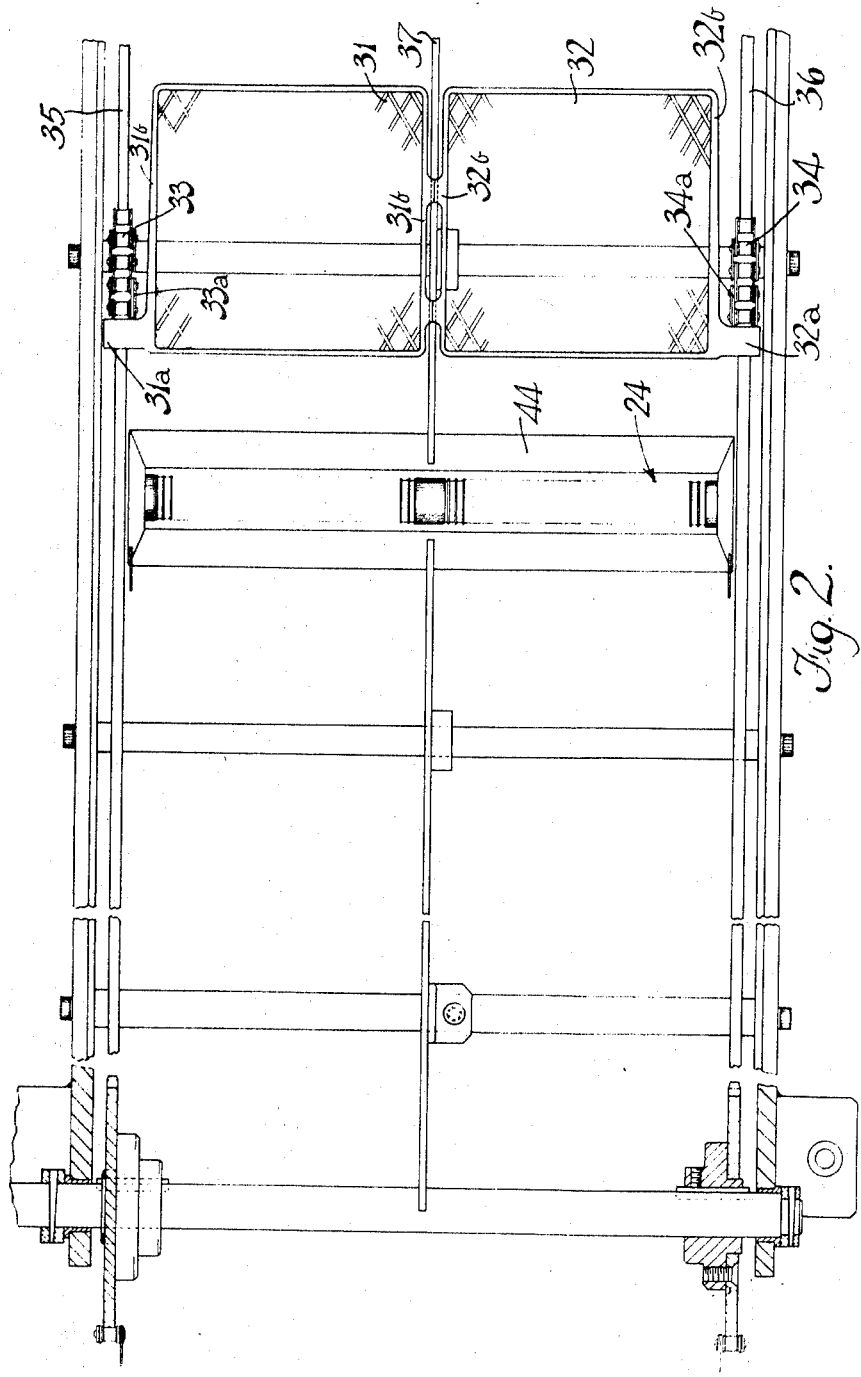

BATTERY PLATE COATING APPARATUS

This application is a divisional application of parent application Ser. No. 814,563 filed Apr. 9, 1969, now abandoned which application Ser. No. 814,563 was a continuation-in-part of our application Ser. No. 704,011 filed Feb. 8, 1968, now abandoned.

This invention relates to apparatus for the manufacture of battery plates, particularly plates for use in lead-acid batteries.

In manufacturing a battery plate it is necessary to apply a paste of material to an electrically conductive grid and then to ensure that the interstices of the grid are filled with the paste. Depending on the battery being manufactured, the grid may be over-pasted (i.e. the paste stands proud of the grid) on one or both faces of the grid.

Conventional techniques employ some form of mechanical device to force the paste into the interstices of the grid, and the forces involved impose some limitations on the thickness of the grids used, because if the grid is too thin it will buckle under the applied force. The actual thickness limitations of course depends on the material from which the grid is made. The present invention constitutes apparatus for use in a completely new approach to the problem of pasting a grid, and, for a given grid material, permits thinner grids to be used than in conventional processes, with consequential reduction in the overall weight of the resultant battery.

The apparatus is used to perform a method which is characterized essentially in that paste is placed on one face of a grid and caused to flow into the interstices of the grid by vibrational energy, preferably ultrasonic vibrations. Audible vibrational energy is not preferred because steps must be taken to protect personnel. Using the preferred apparatus; grids have successfully been pasted by supplying paste to one face and causing it to flow into the interstices of the grid using ultrasonic vibrations. Enough paste can be caused to flow into the interstices to ensure that, for some purposes, a plate formed in this way is satisfactory. However, it is preferred to cause the paste to flow into and through, and then to invert the grid after the paste flows through, and subject said opposite face to further ultrasonic vibrations, with or without the addition of more paste.

An example of the invention is illustrated in the accompanying drawings in which:

FIG. 1 is a schematic flow sheet,

FIG. 2 is a fragmentary plan view of part of a conveyor shown in FIG. 1,

FIG. 3 is a part-sectional view through the conveyor and sonotrode,

METHOD

Figure 4:
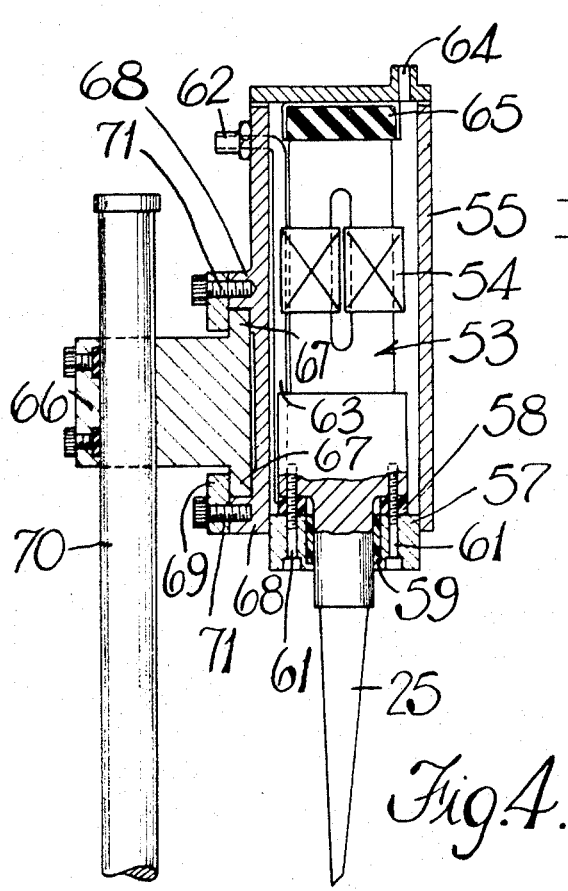
FIG. 4 is a sectional view of an ultrasonic tool of which the sonotrode forms part.

The preferred method is best explained with reference to FIG. 1. Grids 21 are fed by any convenient known means to a conveyor 22. Above the conveyor 22 is a device 23 for supplying a paste of active material to the grids 21. The grids with the paste on their upper face are then fed onto a support 24 located beneath a sonotrode 25, the ultrasonic energy from which causes the paste on each grid 21 to flow into the interstices of the grid. In the example shown, it is desired to over-paste both sides of the grid, and so the support 24 is in the form of a bar with channels extending around the upper part of its circumference, the arrangement being such that the paste flows into and through the grid and so into the channels, but leaves the channels as the grid leaves the support 24, so that there will be ribs of paste extending longitudinally on the lower face of each grid 21. The grids are inverted and fed to a further conveyor 26 which feeds the grids to a further support 27 in the form of a plain roll, the support 27 being positioned below a second sonotrode 28 which smooths the ribs so that both faces of the grid are overpasted. Finally, the grids are fed to an oven 29 and dried in conventional manner.

Although the invention is applicable to other plates, the preferred example is used to manufacture plates of lead-acid batteries. The paste used is a conventional paste, the constituents of which depend on whether a positive or a negative plate is being made. The consistency of the paste is not critical, but a figure of about 24 units on the Globe penetration scale is preferred. Approximately 100 grams of paste was supplied to each grid, the grid dimensions being 4.875 inches by 4.5 inches, and the grid thickness being 0.065 inches. The frequency of the sonotrode 25 is not critical, and frequencies of up to 24 KC/S have been used, this upper figure being dictated solely by the frequencies available from commercially produced ultrasonic tools. The amplitude of vibration of the sonotrode can vary the nature of a finished product slightly and it can be anywhere in the range of 0.0001 to 0.01 inches, a typical preferred figure being 0.002 inches when manufacturing lead plates for use in a battery for a road vehicle. The power available for the sonotrode is also non-critical provided that sufficient power is available to prevent the sonotrode, which dips the paste, from becoming substantially damped by the paste. A 600 watt sonotrode has given satisfactory results. Using the preferred figures quoted, it has been found possible to paste grids satisfactorily with the conveyor 22 travelling at 65 feet per minute, which compares very favorably with conventional pasting machines.

The preferred method disclosed is, of course, capable of considerable variation. By way of example only, further paste can be added to each grid 21 if required as by means 100 just before the grid reaches the sonotrode 28. If it is not required to overpaste on both sides of the grid, or if it is required to paste on one side only, then the ribbed roll 24 can be replaced by a plain roll, and satisfactory results can be achieved without the inversion and further operation by the sonotrode 28. The paste could also be placed on the grids by hand. It should also be noted that the ribs of the roll 24 are merely to provide support for the grids, and if the grids are self-supporting the ribs are not required. In this case overpasting of both sides of the grid could be achieved in a single vibration by having the grids spaced from a plain roll 24.

Successful results have been achieved with a wide variety of grids. For example, dispersion strengthened lead grids can be used, whether such grids are formed by rolling, stamping or any other technique, and whether the ribs of the grid are at right-angles or extend diagonally with respect to the frame of the grid. Successful results have also been achieved with synthetic resin grids coated with conductive material. It has been found possible to paste grids up to 0.25 inches in thickness using a single sonotrode, or up to 0.5 inches in thickness using the double sonotrode arrangement shown in FIG. 1 with paste being added before operation by the second sonotrode.

APPARATUS

Parts of the apparatus have already been mentioned briefly in the description of the method, but the preferred apparatus for performing the preferred method will now be described in detail. The apparatus disclosed is actually intended for pasting lead grids which are cast in conventional manner in the form of a pair of grids joined at their bases, the lugs extending from the sides of the grids opposite the bases. Such a pair of grids is shown at 31 and 32 in FIG. 2, with their lugs at 31a and 32a respectively. The lugs 31a, 32a, rest on a pair of roller chains 33, 34 the rollers of the chains running on supports 35, 36 forming part of the frame of the machine. The bases of the grids 31, 32 rest on a rail 37 which also forms part of the frame of the machine, and the grids are driven by fingers 33a, 34a upstanding from the chains respectively and engaging the lugs. The spacing between adjacent said fingers is slightly greater than the width of a grid. It will be appreciated that the chains 33, 34 can be driven in any convenient manner, and with their associated supports constitute the conveyor 22 shown in FIG. 1.

Reverting to FIG. 1, the device 23 is in effect a combined paste mixing and feeding station. The constituents of the paste are inserted into a hopper 38 containing any convenient form of mixer (not shown), and the paste is extruded from the hopper 38 through a nozzle 39 in the form of a strip of paste, conveniently of rectangular or elliptical cross section. Mounted forwardly of the nozzle 39 is a rotary cutter 41 which consists of a central shaft 42 extending between end plates which carry a pair of wires 43 extending parallel to the shaft 42. The arrangement is such that as the shaft 42 rotates, each wire 43 in turn cuts into the extruded paste, the effect being that each grid in turn is coated with flakes of paste over its upper face. The relative speeds of the various components can be adjusted to give the required amount of paste on each grid, but if for any reason extreme accuracy is required, some form of sensing device can be incorporated to determine the amount of paste on each grid and adjust the relative speeds of the various components to give the exact amount required.

Referring now to FIGS. 2 and 3, the bar 24 is formed from steel, and is carried by a mounting block 44. Super heated steam is fed by way of a pipe 45 through the mounting block 44 to the interior of the bar 24 to be heated to a temperature in the range 120°C. to 200°C., the purpose of heating the bar 24 being to facilitate removal of the grid from the bar. If necessary, a jet of air could also be used to facilitate removal. The upper half of the bar 24 is formed throughout its length with circumferentially extending semi-circular channels 46 having a maximum depth at the uppermost part of the bar.

Figure 5:
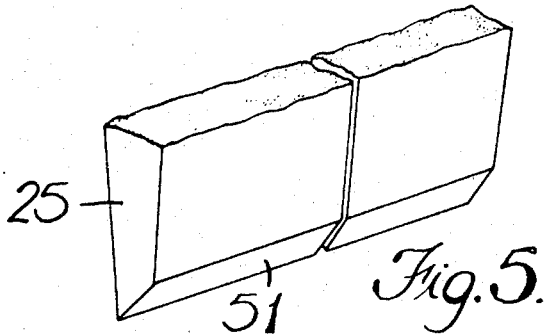
FIG. 5 is a perspective view of the sonotrode

The sonotrode 25 mounted above the bar 24 is shown in perspective in FIG. 5. It will be noted that in the preferred form the sonotrode has an inclined face 51 which is presented to the grids as they are traversed passed the sonotrode the purpose of the face 51 being to guide the paste beneath the sonotrode. It is found preferable for the face 51 to present an angle of between 30° and 45° to the horizontal. It may be desirable to have the axis of the sonotrode at an angle other than 90° to the direction of movement of the grid, but the angle of 30° to 45° would still preferably be returned. The sonotrode 25, as shown in FIG. 4, forms part of an ultrasonic tool including in addition to the sonotrode 25 a velocity transformer 52 and a transducer 53 including an energizing winding 54. The tool is mounted in a container 55 with the upper surface of the transducer 53 bearing against a rubber block 56 at the top of the container, the lower part of the container being closed by a mounting block 57. Between the mounting block 57 and the velocity transformer 52 is a further rubber pad 58, whilst acting between the block 57 and a further part of the velocity transformer of reduced section is a mounting bush 59 the purpose of which is to mount the velocity transformer. The bush 59 is formed from low energy absorbing material, for example p.t.f.e., and its purpose is to mount the lower end of the tool whilst permitting the tool to be adjusted axially, without the necessity of having a rigid mounting sited at a nodal point. In order to provide for fine adjustment of the sonotrode 25 with respect of the bar 24, bolts 61 are provided with a sliding fit in the block 57 and extend through holes in the annular block 58 into screw fitted engagement with the velocity transformer 52, so that by adjusting the bolt 61 the position of the sonotrode 25 with respect to the block 57 can be accurately determined. The tool is water cooled, and for this purpose there is provided a water inlet 62 from which water is fed through a tube 63 extending to the lower part of the casing 55, the water leaving the casing by way of an outlet 64 at the upper end of the casing.

The casing 55 is mounted for movement in a vertical plane to give coarse adjustment of the position of the sonotrode 25, and is also mounted for movement in a lateral direction to paste the double grid referred to previously, four ultrasonic tools are used. The pairs of ultrasonic tools are similar, and so only one pair will be described. The reason for using a pair of sonotrodes side by side for a grid is that commercially available sonotrodes are not sufficiently wide to cope with grids of the dimensions previously indicated. The sonotrodes form part of separate tools, and it is for this reason that the sonotrodes 25 must be accurately positioned so that the grid when pasted, will have the same level of paste on the two halves corresponding to the two sonotrodes respectively. A p.t.f.e. shim can be provided between adjacent surfaces of the sonotrode in a pair if necessary.

In order to mount the casing 55, there is provided a pair of pillars 70 on which is mounted a vertically movable slide 66. The slide 66 has at its forward end a pair of flanges 67 which are trapped between the casing and mounting plates 69 which are secured to the flanges 68 on the casing by bolts 71. The casing 55 can be moved vertically on the pillars 70, and by releasing the bolts 71 lateral movement of the casing can be obtained.

Reverting now to FIG 1, the grids leave the sonotrode 25 still on the conveyor 22, and pass beneath a heated doctor blade 72. The purpose of the blade 72 is to smooth the small ridge of paste resulting from the inevitable small spacing between the pair of sonotrodes 25 acting on a grid. After passing the blade 72, the grids are fed past a sensing head 73 to a rotary device 74 which inverts the grids and feeds them to the conveyor 26. Movement of the device 74 is controlled by the sensing head 73. The conveyor 26 feeds the grids onto the bar 27, which has no channels, and whilst on the bar 27 the sonotrode 28, which conveniently forms part of an ultrasonic tool of the same form as the tool including the sonotrode 25, smooths the ribs of paste which were formed as a result of the channels in the bar 24. There will, of course, be a pair of sonotrodes 28, and after leaving the bar 27 the conveyor 26 feeds the grids past a further doctor blade 75 to an oven 29 for drying the paste. When the grids leave the oven 29 they pass a further sensing head 74 and then are fed to a further rotary device 76 having combined therewith an internal rotating brush 77 and an external rotating brush 78. The design of the device 76 is such that the sides of the grid are exposed, and are acted upon by the brushes to remove any excess material from the sides of the grid. There is no need to brush the sides of the grids which incorporate the lugs, because the edges of the sonotrodes above there sides are protected from paste spreading beyond the edges 31b, 32b shown in FIG. 2 by plates 82 (FIG. 2) fixed in a vertical plane relative to the machine, but spring loaded into engagement with the sonotrode in any convenient manner. The vertical position of each plate 82 is such that it is as close to the top of the grid as practicable. Each of the outermost pair of sonotrodes also has associated therewith a plate 81 which is co-planar with the sloping face of the sonotrode and fixed relative to the frame of the machine, the plates 81 preventing paste flow up to the sonotrode.

Turning once again to FIG. 1, any convenient means indicated at 85 is used to separate the pairs of grids when they leave the device 76.

It will, of course, be appreciated, that the apparatus can be modified in a variety of ways. One particular important modification is the replacement of the conveyor 22 by a sprocket-type drive, the sprockets engaging holes formed along the edges of the grids. This arrangement cannot be employed with the particular form of grids shown, but the grids can readily be modified so that their lugs point inwardly. This technique is particularly suitable for use with synthetic resin grids, and has the additional advantage that the conveyor 22 can be formed in two parts on opposite sides respectively of the sonotrode 25. The part of the conveyor on the left hand side of the sonotrode 25 can then be driven faster than the other part of the conveyor, so that there is a larger spacing between the grids as they are presented to the device 74.

In certain circumstances, a pair of sonotrodes which are acting on a single grid can each be inclined to the horizontal with their adjacent edges uppermost. This arrangement produces a grid in which the paste is thicker at the middle of the grid than at the edges, which in certain circumstances can be advantageous. It will also be appreciated that where a pair of sonotrodes are to act on a single grid as described, it is not essential for the two sonotrodes to be side by side. Another arrangement is to feed the grids vertically and to supply paste, for example in the form of strips, to each side of the grid, the paste being acted upon by a pair of sonotrodes at opposite sides of the grid.

If necessary, the bar 24 could be rotated from time to time and cleaned.

In the example described above, a pair of sonotrodes must be used, but it has been found that a wider sonotrode than those commercially available can be used if the sonotrode is formed with n parallel, closed ended slots which divide the sonotrode into n+1 portions of substantially equal width, said slots extending generally parallel to the direction of vibration of the sonotrode in use.

Figure 6:
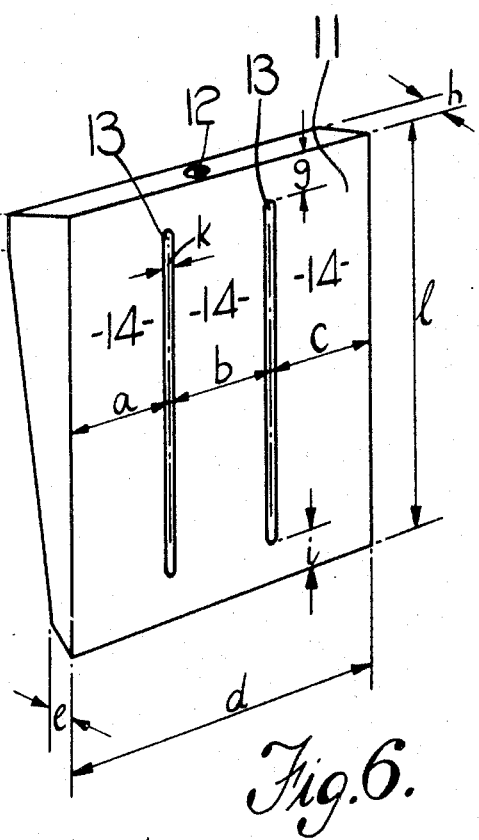
FIG. 6 is a perspective view of another form of sonotrode.
Figure 7:
FIG. 7 is an end view of the sonotrode shown in FIG. 6.

An example of such a sonotrode is shown in FIGS. 6 and 7. The sonotrode is formed from a substantially rectangular block 111 of metal, of substantially triangular cross-section. Extending into the block 111, from the mid-point of the upper face thereof (as shown in the drawings) is a screw-threaded bore 112, which in use receives a correspondingly screw-threaded shank, whereby the sonotrode is secured to the velocity transformer of an ultrasonic tool. Between the upper and lower edges of the block 111, the block 111 is formed with a pair of parallel, closed ended slots 113, which divide the block into three substantially equally dimensioned portions 114. The width of these portions 114 must not of course exceed the maximum permitted width for a single sonotrode.

FIGS. 6 and 7, which are not drawn to scale, indicate various dimensions which in the preferred embodiment had the following values in inches:

| | | | |
|---|---|---|---|
| a,b,c | = 1½ | h | = 1.0 |
| d | = 4½ | i | = ⅝ |
| e | = 5/16 | j | = 5/16 |
| f | = ¼ – ½ | k | = ¼ |
| g | = ⅝ | l | = 6.0 |

Having thus described my invention what I claim as new and desire to secure by Letters Patent is:

1. Apparatus for manufacturing a battery plate for a lead-acid battery, the apparatus having the following features:
   a. a support member
   b. means for heating the support member during operation of said apparatus
   c. a probe disposed opposite said support member and defining with said support member a gap therebetween
   d. conveyor means for transporting through and between said gap a battery plate grid having thereon a lead-based paste with one surface of said grid in contact with said support member
   e. means for adjusting the relative positions of the support member and probe whereby said probe dips into said paste while said grid rests on said support member
   f. means vibrating said probe at a frequency to change the consistency of said paste while said grid is in contact with said support member, whereby said paste flows into said grid.

2. Apparatus for manufacturing a battery plate, comprising an ultrasonic tool including a sonotrode, a support positioned beneath said sonotrode and accurately positioned relative thereto, and feed means for traversing a battery plate grid having a paste of material on one face thereof over and in contact with said support and past the sonotrode whereby the sonotrode dips into the paste and causes the paste to flow into the interstices of the portion of the grid in contact with the support, said sonotrode presenting an inclined surface to said grid, said surface defining means guiding the paste on the grid beneath the sonotrode.

3. Apparatus as claimed in claim 3 including means for heating the support.

4. Apparatus as claimed in claim 2 in which the angle between said surface and the grid is between 30° and 45°.

5. Apparatus as claimed in claim 2 including means for inverting the grid after it has passed the sonotrode, and further feed means for transversing the inverted grid past a second sonotrode which smooths the paste which is caused to flow through the grid by the first-mentioned sonotrode.

6. Apparatus as claimed in claim 5 including means for supplying a further paste material to the grid after it is inverted but before it passes the second sonotrode.

7. Apparatus for manufacturing a battery plate for a lead-acid battery, the apparatus having the following features:
   a. a fixed support
   b. means for heating the support
   c. a probe defining with said support a gap
   d. a paste containing hopper laterally spaced from the probe and support.
   e. conveyor means for transporting a battery plate grid beneath said hopper, whereupon paste is deposited on said grid
   f. said conveyor means then transporting the grid through said gap
   g. means for adjusting the relative positions of the support and probe whereby said probe dips into said paste while said grid rests on said support.
   h. means vibrating said probe at a frequency to change the consistency of said paste, whereby said paste flows into said grid.

8. Apparatus for manufacturing battery plates, the apparatus having the following features:
   a. a probe;
   b. a support disposed opposite said probe and defining a gap therebetween;
   c. driven conveyor means for transporting through and between said gap a battery plate grid having thereon a paste which is to be introduced into the grid, said paste having such consistency that it does not flow into the grid, said conveyor means moving said grid past the probe with one surface of said grid in contact with said support;
   d. said probe and said support being spaced apart and positioned so that said probe dips into said paste while said grid rests on said support;
   e. means vibrating said probe at a frequency to change the consistency of said paste while said grid is in contact with said support, whereby said paste flows into said grid.

9. Apparatus for manufacturing a battery plate, comprising an ultrasonic tool including a sonotrode, a support positioned beneath said sonotrode and accurately positioned relative thereto, and feed means for traversing a battery plate grid having a paste of material on one face thereof over said support and past the sonotrode whereby the sonotrode dips into the paste and causes the paste to flow into the interstices of the portion of the grid on the support, said sonotrode presenting an inclined surface to said grid and guiding the paste on the grid beneath the sonotrode, and the apparatus including guide plates associated with the sonotrode for minimizing spillage of paste in a direction at right angles to the travel of the grid.

10. Apparatus for manufacturing a battery plate, comprising an ultrasonic tool including a sonotrode, a support positioned beneath said sonotrode and accurately positioned relative thereto, and feed means for traversing a battery plate grid having a paste of material on one face thereof over said support and past the sonotrode whereby the sonotrode dips into the paste and causes the paste to flow into the interstices of the portion of the grid on the support, said sonotrode presenting an inclined surface to said grid and guiding the paste on the grid beneath the sonotrode, and said sonotrode being formed with N parallel closed ended slots which divide the sonotrode into N+1 portions of substantially equal width, said slots extending generally parallel to the direction of vibration of the sonotrode in use.

* * * * *